United States Patent [19]

Brock et al.

[11] Patent Number: 4,944,630
[45] Date of Patent: Jul. 31, 1990

[54] CONNECTOR AND METHOD OF CONNECTION BETWEEN A ROAD MAKING MACHINE AND THE FIFTH WHEEL OF A TRACTOR

[75] Inventors: James D. Brock, Chattanooga, Tenn.; Donald W. Smith, Aurora; James H. Bassett, Sycamore, both of Ill.

[73] Assignee: Barber-Greene Company, DeKalb, Ill.

[21] Appl. No.: 307,684

[22] Filed: Feb. 7, 1989

[51] Int. Cl.$^5$ .............................................. E01C 19/00
[52] U.S. Cl. ...................................... 404/83; 198/312
[58] Field of Search .................. 404/83, 101; 198/300, 198/311, 312, 316.1; 280/423.1, 425.1, 433; 14/2.4

[56] References Cited

U.S. PATENT DOCUMENTS

| | | | |
|---|---|---|---|
| 2,687,225 | 8/1954 | Martin | 14/2.4 X |
| 3,150,756 | 9/1964 | Stauth | 198/300 |
| 4,135,614 | 1/1979 | Penterman et al. | 198/306 |
| 4,818,139 | 4/1989 | Brock et al. | 404/108 |

Primary Examiner—Jerome W. Massie, IV
Assistant Examiner—Matthew Smith
Attorney, Agent, or Firm—Jones, Day, Reavis & Pogue

[57] ABSTRACT

A reversible connector and method of connection between a large road making machine and the fifth wheel of a tractor to facilitate towing of the machine. The connector has a downwardly projecting king pin which is adjustable between a retracted, operating position and an extended, towing position. It can be either slid or pivoted between those positions. The connector can be used on an apparatus having a chassis, a downwardly extending conveyor pivotally attached to an end of the chassis and a hydraulic cylinder to pivot the conveyor relative to the chassis. The hydraulic cylinder can lift the inlet end of the conveyor off the ground to put the fifth wheel connector in a position such that it can engage the fifth wheel of a tractor. The hydraulic cylinder also can be used to pull the front portion of the chasis up off the ground.

27 Claims, 4 Drawing Sheets

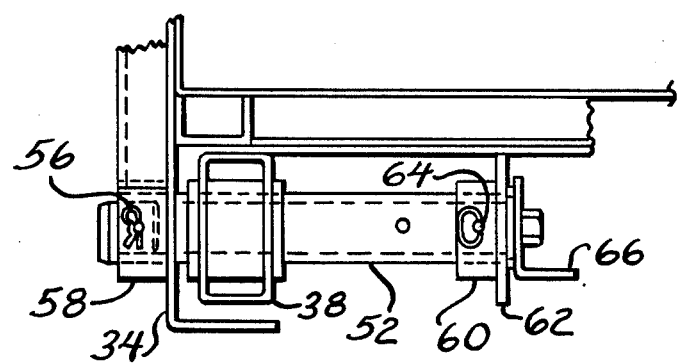
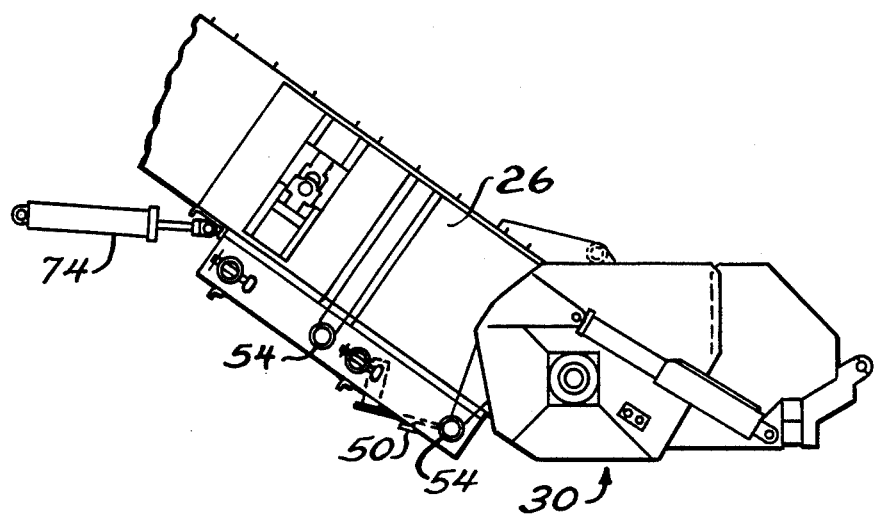

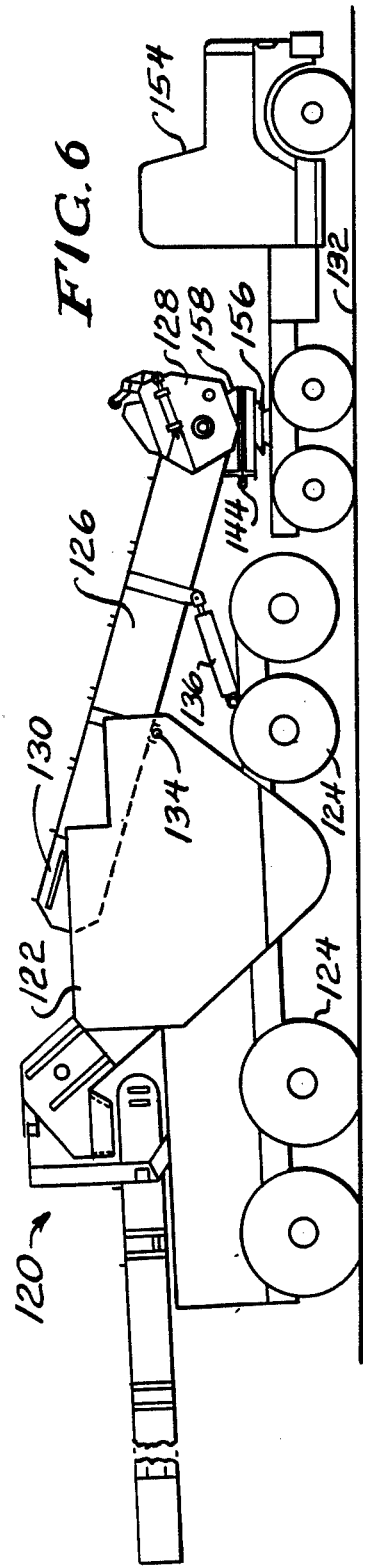
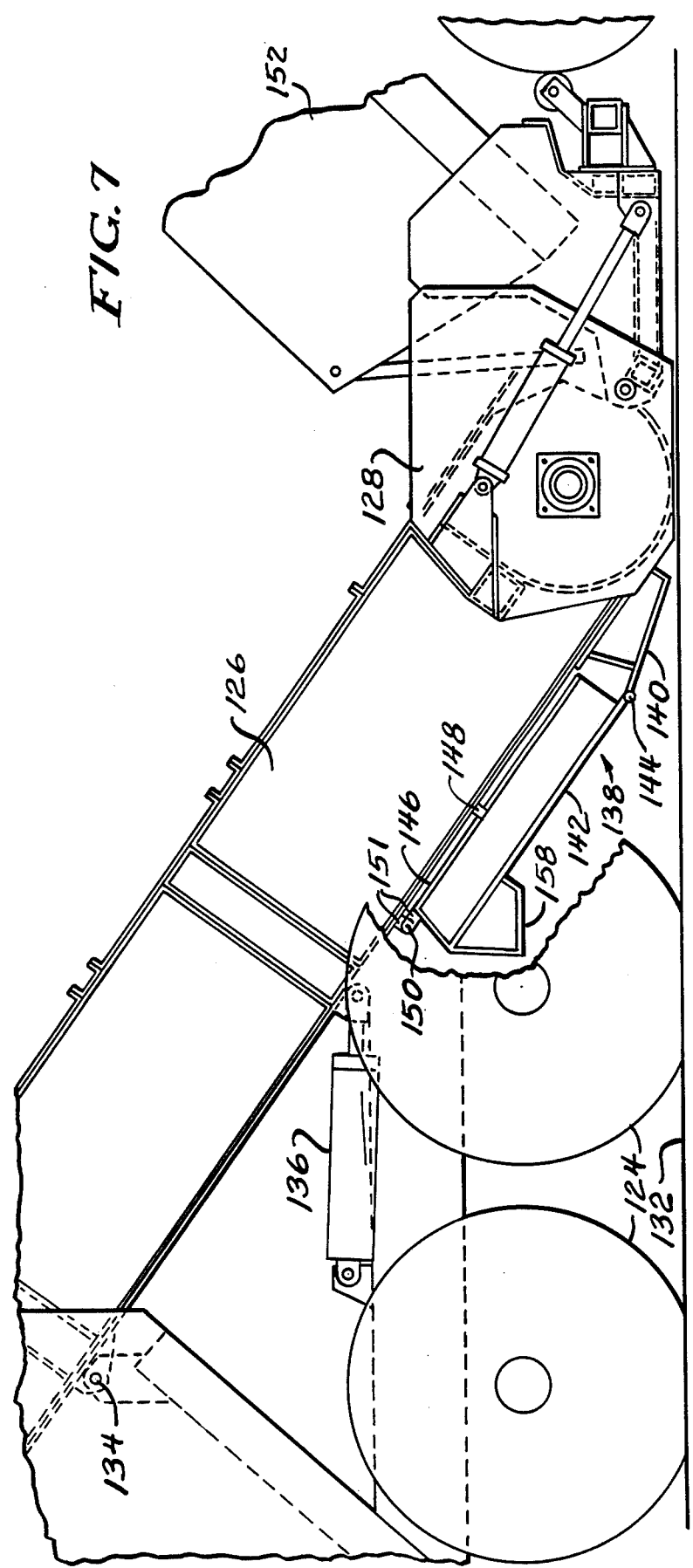

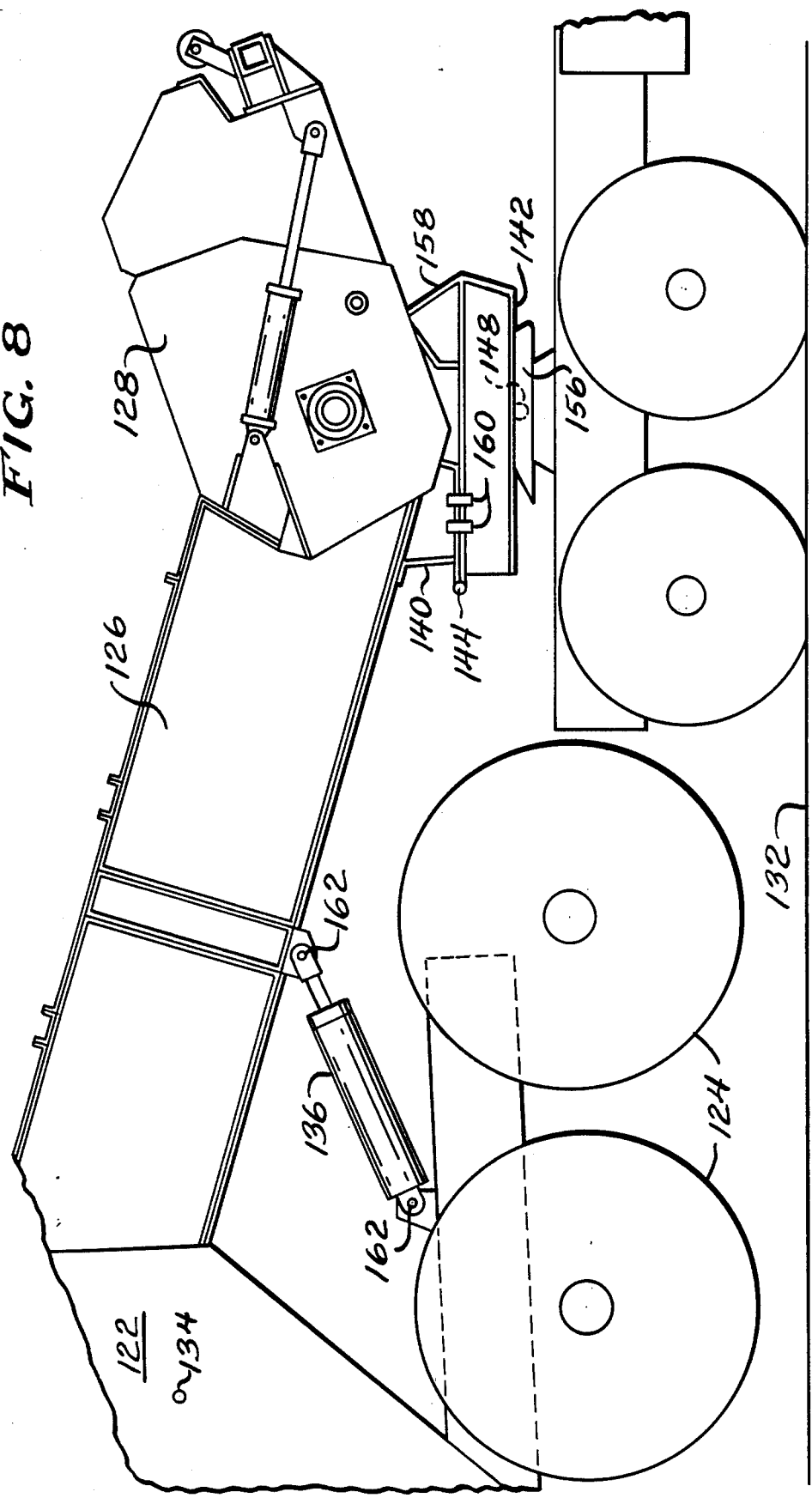

CONNECTOR AND METHOD OF CONNECTION BETWEEN A ROAD MAKING MACHINE AND THE FIFTH WHEEL OF A TRACTOR

BACKGROUND OF THE INVENTION

The invention relates generally to the towing of equipment. In particular, the invention relates to towing large road making machinery behind a truck which has a fifth wheel.

Although large road building machinery can be mobile, these machines are normally limited to a self-propelled speed of about 25 miles per hour or less. Accordingly, transporting a large road making machine any significant distance requires a good deal of time, even if the machine was operated at its maximum self-propelled speed. Further, in the past, towing this type of machine behind a tractor required supporting the entire machine on a flatbed trailer. This is an awkward method of transport and, of course, requires a flatbed truck or trailer.

It is an object of the present invention to provide a connector between a road making machine to the fifth wheel of a tractor which will not interfere with the operations of the machine.

It is another object of the present invention to provide a road making machine with a permanently attached connector capable of reversible connection to the fifth wheel of a tractor.

It is yet another object of the invention to provide a method of towing a large road making machine by use of a tractor.

Other and further objects will become apparent from the following discussion of the invention and its embodiments.

SUMMARY OF THE INVENTION

In accordance with the invention, a large mobile machine used in road making, such as the SHUTTLE BUGGIE TM apparatus (the subject of U.S. Pat. application Ser. No. 89,318, Pat. No. 4,818,139 incorporated herein by reference) has a downwardly extending conveyor which is pivotally attached to the chassis of the machine. A hydraulic cylinder moves the conveyor about its connection to the chassis such that the distal end of the conveyor can be varied between a lowered position, close to the ground, and a raised position several feet off the ground.

A reversible connector is fixedly attached to the underside of the conveyor near the distal end. Two embodiments of the connector are disclosed; a preferred embodiment which slides between an operating position and a towing position, and an alternative embodiment which pivots between those positions.

The preferred sliding connector embodiment utilizes a king pin attached to a rectangular frame which can slide on a track attached to the conveyor. The frame is supported on the underside of the conveyor by L-shaped tracks. A series of locking pins are reversibly inserted through holes in the tracks and the sides of the supporting frame to lock the frame in either a retracted position, used during operation of the machine, or in the extended position, used when the machine is towed.

Alternatively, a second embodiment is contemplated which also allows easy rearrangement of the connector between the retracted and the extended positions. This variation utilizes first portion that is securely attached to the conveyor and a distal portion pivotally attached to the first, securely fixed portion. The distal portion can be swung out of the way of the conveyor when the machine is in use, but can be pivoted into a towable position when the king pin is needed to tow the machine. In both embodiments, the reversible connector is permanently attached to the machine without interfering with the normal road making operations of that machine.

Road making machines with conveyors normally raise and lower the conveyor relative to the ground by using a hydraulic cylinder. However, the invention disclosed herein uses this same cylinder during the towing operation to lift the distal end of the conveyor several feet off the ground to a height such that the king pin will slide into the fifth wheel of the tractor.

After the reversible connector is engaged on the fifth wheel, the hydraulic cylinder is contracted as it normally would be to lower the distal end of the conveyor to the ground. However, because the conveyor cannot be lowered any further than the fifth wheel of the tractor, further contraction of the hydraulic cylinder acts to raise the wheels at one end of the road-making machine off the ground. In this position, the road making machine rests on its rearward wheels and is ready to be towed.

BRIEF DESCRIPTION OF THE DRAWINGS

FIG. 4 shows a cross-sectional view through section line 4—4 if FIG. 2;

FIG. 5 shows a side planar view of the distal end of the conveyor with the connector of FIG. 1 in the retracted position;

FIG. 6 shows a side planar view of a large road making machine towed by a tractor, the machine connected to the fifth wheel of the tractor by an alternative connector embodiment;

FIG. 7 is a side elevational view of the distal end of the conveyor with the connector of FIG. 6 in the retracted position; and FIG. 8 is a side elevation view of the distal end of the conveyor with the connector of FIG. 6 in the towing position.

DETAILED DESCRIPTION OF THE INVENTION

Figure 1:
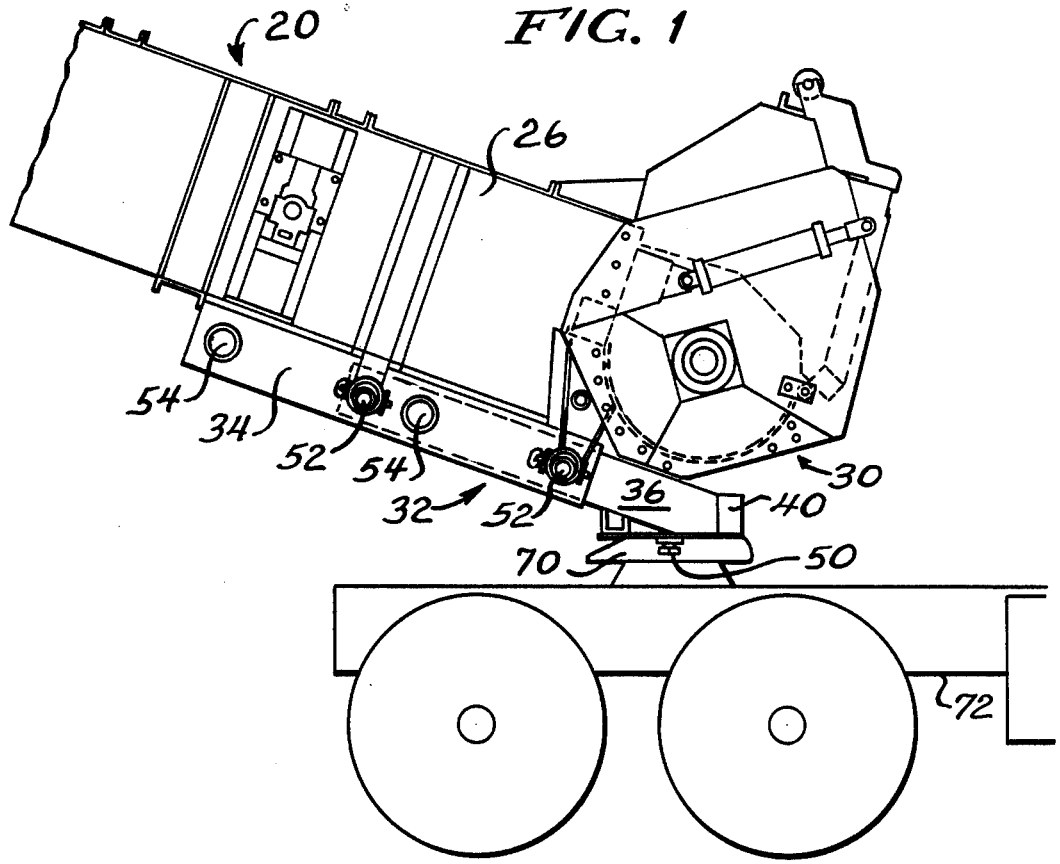
FIG. 1 shows a side elevational view of the distal end of the conveyor and the preferred embodiment of the connector in the towing position.

The invention is better understood by reference to the above-described figures. The preferred embodiment is depicted in FIGS. 1-5, while the alternative embodiment is shown in FIGS. 6-8.

With respect to the preferred embodiment, the reversible connector in use on a conveyor is generally designated by the numeral 20. The chassis of a road making machine has attached to it a conveyor 26 with distal end 30. The distal end 30 is the end of the conveyor normally used as the inlet end of the conveyor for introducing material into the road making machine.

A reversible connector 32 is attached to the underside of the distal end 30 of the conveyor 26. It comprises L-shaped tracks 34 attached to either side of the conveyor pan. The L-shaped track defines an area running parallel to and underneath the conveyor 26 in which a frame 36 can be slideably supported.

The frame 36 comprises side tubes 38 having rectangular cross-section, cross plate supports 40 and king pin support plate 42. Additional support braces include cross braces 44 and perpendicular supports 46 and 48. Attached to the king pin support plate is the king pin 50 which projects in a generally downward direction. The king pin is configured to engage the fifth wheel of a tractor.

The frame 36 is restricted from movement within the tracks 34 by a series of locking pins 52 which slide through holes or aperatures 54 in the tracks 34 and corresponding holes or aperatures 56 in the frame 36. After the locking pin 52 is slid through the track 34 and side tube 38, it is locked in place by a cotter pin 56 which travels through collar 58. Locking pin also slides through collar 60 in support 62 to further secure locking pin 52 in place. Pin 64 is slid through collar 60 and locking pin 52 to further secure the locking pin 52 against lateral movement.

L-bracket 66 contains aperature 68 and is attached to the locking pin 52 such that rotational movement of the locking pin at bracket 66 will lift frame 36 off track 34. The hole 68 in bracket 66 facilitates use of a pipe, screwdriver or other leverage means to rotate locking pin 52.

Figure 2:
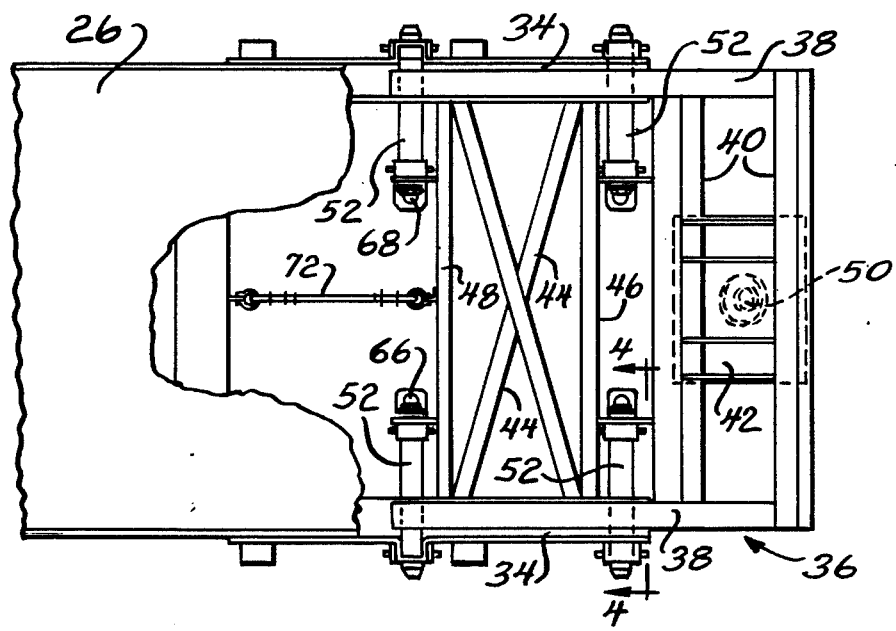
FIG. 2 shows a top planar view of the distal end of the conveyor, with the conveyor partially cut-away to reveal detail of the connector of FIG. 1.
Figure 3:
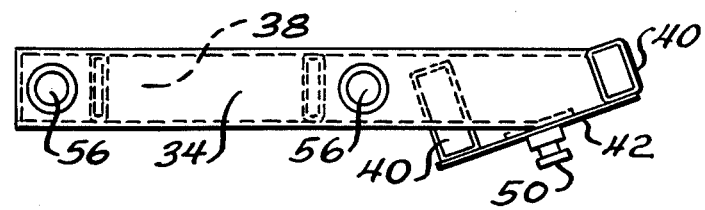
FIG. 3 shows a side elevational view of the slideable portion of the connector of FIG. 1.

The preferred embodiment of the inventive connector is shown in FIG. 2 in the extended or towing position. In this position, the king pin is freely projecting down from the distal portion 30 of the conveyor 26, and can be connected with the fifth wheel 70 of a tractor 72 for towing. The frame and king pin, when in this position, will obstruct the normal operations of the road making apparatus. However, when the conveyor is being used, the frame 36 is slid into the retracted position as shown in FIG. 5. In that position, the king pin 50 is out of the way of the operations of the distal end 30 of conveyor 26.

The frame is moved from the towing position (FIG. 1) to the operating position (FIG. 5) by removing the locking pins 52, sliding the frame 36 back so frame holes 56 correspond with track holes 54 (shown without pins in FIG. 1), and inserting pins 52 through the track and frame holes. A cable 72 is connected between the conveyor and the frame to prohibit unrestricted forward movement of the frame 36 in the tracks 34 when the pins 52 are not in place.

The conveyor 26 is pivotally attached to the chassis to move the distal end of the conveyor up or down relative to the ground. The specific use of the hydraulic cylinder 74 with the preferred embodiment during engagement of the apparatus to the tractor is the same as its use with the alternative embodiment described below.

The alternative connector embodiment depicted in FIGS. 6-8 is distinguished from the preferred embodiment in that it is pivotally adjusted, rather than slid, between the operational and towing positions. With respect to FIG. 6, the road making machine 120 is a "shuttle buggie", described in detail in U.S. Pat. application Ser. No. 89,318, now Pat. No. 4,818,139. This machine is representative only; the present invention, both the preferred and alternative embodiments, could be used on any machine, for road making purposes or not, that has a downwardly extending structure which is pivotally supported from a chassis.

Attached to one side of the chassis 122 is a conveyor 126 with an inlet end 128 and a discharge end 130. The inlet end 128 is lower than the discharge end 130 and is capable of reaching to the road surface 132. The conveyor is pivotally supported on the chassis at pivotal connection 134 and is tilted up or down relative to the pivotal connection 134 by hydraulic cylinder 136.

As shown in FIG. 7, a reversible fifth wheel connector 138 is attached to the underside of the conveyor 126 near the inlet end 128. The reversible connector 138 comprises a secured portion 140 which is permanently affixed to the underside of the conveyor and distal portion 142, which is pivotally attached to the front portion 140 at a pivot hinge 144. The distal portion 142 has a flat side 146 facing the underside of conveyor 126, and a king pin 148 facing the underside of the conveyor 126. The distal portion 142 is reversibly attached to the underside of conveyor 126 by tongue 150 which has a pin receiving aperature which corresponds to an aperature in bracket 151 attached to the conveyor 126.

When the pivoting connector 138 is in the operating mode, it is completely out of the way of the useful operations of conveyor 126. As depicted in FIG. 7, a truck 152 is dumping a load into the conveyor 26 such that the material from the truck 152 to the conveyor discharge end 130 and, ultimately, into chassis 122. When in the operating mode, the connector 138 is completely out of the way of these operations.

The chassis 122 is capable of self-propelled movement: it utilizes hydrostatic power which is more than adequate for movement during road making operations, but is limited to a maximum speed of 20-25 miles per hour. In order to transport the machine 120 between job sites at higher speeds it must be towed behind a tractor 154. A standard tractor normally utilized for towing a trailer (to comprise a tractor/trailer combination) has a fifth wheel 156. The structure of the fifth wheel, as shown in FIGS. 6 and 8, is well known in the art.

The connector 138, as shown in FIGS. 6 and 8, is in the towing position with distal portion 142 below secured portion 140. The connector 138 is easily repositioned from the operating position, as shown in FIG. 7, to the towing position by disconnecting tongue 150, swinging the distal portion 142 from bracket 151 (by removing a pin or bolt) and pivoting the distal portion about hinge 144 until the distal portion 142 makes contact with the secured front portion 140.

When in the towing position, the king pin 148 is generally disposed to project in a downward manner. Also, when in this position, a support triangle 158 on the distal portion of the fifth wheel connector rests against the inlet end 128 of the conveyor 126. The distal portion 142 is bolted or otherwise reversibly connected to front portion 140 by bolts 160. The king pin 148 protrudes downwardly from the distal portion 142 into the fifth wheel 156 and engages the fifth wheel of the tractor 154.

Hydraulic cylinder 136 is connected between the chassis 122 and conveyor 126 by hinge connections 162. When the hydraulic cylinder 136 is extended the inlet or distal end 128 of the conveyor 126 is raised off the ground. The inlet end 128 can be raised to a level where the distal portion of the connector 138 can be freely unhooked from the conveyor and swung around to the towing mode and bolted in place with bolts 160. The inlet end is then high enough (or can thereafter be raised to be high enough) so that the distal portion 142 can engage the fifth wheel when the tractor 154 is backed up under inlet end 128 (or chassis 122 is moved forward towards the tractor so that the inlet end 128 rides into the fifth wheel 156).

After engagement is made between the king pin 148 of distal portion 142 and fifth wheel 156, the hydraulic cylinder 136 is contracted such that the front of the chassis 122 is raised off the road surface 132, as shown in FIGS. 6 and 8. The road making machine is thereby put in a towing position by utilizing the hydraulic cylinder 136 to both raise the inlet end of the conveyor to put it in a position to engage the fifth wheel, and also (when thereafter contracted) to raise the front Portion of the chassis 122 to put the machine in a towing position.

After the machine 120 is towed to its destination by tractor 154, the hydraulic cylinder is again expanded to lower the front wheels 124 to the road surface 132, and to lift the fifth wheel connector 138 slightly above fifth wheel 156. The tractor 154 can then drive away. The distal portion 142 of connector 138 can then be unbolted at bolts 160 and returned to its operating position. It is secured in the operating position by re-inserting a pin or bolt to secure tongue 150 to bracket 151. The inlet end 128 of the conveyor 126 can then be lowered to the ground by further contraction of hydraulic cylinder 136 and be freely operated without being obstructed by the connector 138.

As mentioned above, operation of the preferred embodiment is accomplished with the hydraulic cylinder in the same way as described for the alternative embodiment.

From the above description it will be apparent that there is provided a fifth wheel connector and method of reversibly connecting a large towable machine to the fifth wheel of a tractor with the described desirable advantages, but which obviously are susceptible to modification in their form, method, operation, detailed construction and arrangement without departing from the principles involved. It is to be understood that the invention is not limited to the specific features shown, but that the means, method and construction herein disclosed comprise the preferred form of several modes of putting the invention into effect. The invention is, therefore, claimed in any of its forms or modifications within the legitimate and valid scope of the appended claims.

What is claimed is:

1. A reversible connector between a conveyor supported on a chassis and the fifth wheel of a tractor, the conveyor being moveable relative to the chassis, the reversible connector comprising:
   track means attached to the conveyor;
   support means slideably supported in the track means;
   locking means to reversibly secure the slideable support means to the track means in a plurality of positions; and
   pin means attached to the sliding support means, the pin means capable of connection to the fifth wheel of a tractor.

2. The reversible connector of claim 1 wherein the pin means is a king pin.

3. The reversible connector of claim 1 wherein the track means defines a space between the track means and the conveyor, and wherein the slidable support means is slideably supported in that space.

4. The reversible connector of claim 3 wherein the track means comprises an L-shaped bracket attached to the conveyor.

5. The reversible connector of claim 4 wherein the locking means comprises a locking pin which reversibly communicates between the L-shaped track and the slideable support means.

6. The reversible connector of claim 1 wherein the slideable support means comprises at least two side tubes connected by a cross support, and wherein the pin means is attached to the cross support.

7. A reversible connector between a conveyor supported on a chassis and the fifth wheel of a tractor, the conveyor being moveable relative to the chassis, the reversible connector comprising:
   a base portion capable of fixed attachment to the conveyor;
   a distal portion pivotally attached to the base portion, the distal portion capable of pivoting between an operating position and a towing position;
   a pin means attached to the distal portion, the pin means capable of reversible connection to the fifth wheel.

8. The reversible connector of claim 7 wherein the base portion has a generally flat upper side and a generally flat lower side, and wherein the distal portion has a generally flat side which is capable of pivoting to contact the lower side of the base portion.

9. The reversible connector of claim 8 wherein the distal portion has a second generally flat side and the pin means protrudes from the second flat side.

10. The reversible connector of claim 9, further comprising a support angle attached to the first generally flat side.

11. A towable apparatus capable of connection to the fifth wheel of a truck, the apparatus comprising:
    a chassis;
    conveying means pivotally supported on the chassis, the conveying means having a distal end;
    means connected between the chassis and the conveying means to move the conveying means relative to the chassis;
    means capable of reversible connection to the fifth wheel of the truck, the reversible connection means attached to the conveying means near the distal end;
    whereby the conveying means can be positioned by the hydraulic means to orient the reversible connector means to engage the fifth wheel.

12. The towable apparatus of claim 11 wherein the chassis is self-propelled and supported on at least two sets of wheels.

13. The towable apparatus of claim 12 wherein the hydraulic means is capable of lifting at least one set of wheels off the ground when the reversible connection means is engaging the fifth wheel.

14. The towable apparatus of claim 11 wherein the means for moving the conveying means relative to the chassis is a hydraulic cylinder.

15. The towable apparatus of claim 11 wherein the reversible connection means comprises:
    track means attached to the conveying means to define a space adjacent to the conveying means;
    a frame slideably supported in the track means;
    a king pin attached to the frame; and
    locking means to reversibly secure the frame to the track means.

16. The towable apparatus of claim 15 wherein the frame comprises:
    at least two side tubes which are slideably supported in the track means; and at least two cross supports connecting the side tubes; wherein the king pin is connected to the cross supports.

17. The towable apparatus of claim 15 wherein the track means comprises L-shaped tracks attached to the conveying means to define a rectangular area between the tracks and the conveying means, and the tracks contain an aperature capable of receiving a pin.

18. The towable apparatus of claim 17 wherein at least one side tube contains an aperature corresponding to the truck aperature, and the side tube aperature also capable of receiving a pin.

19. The towable apparatus of claim 18 further comprising a pin communicating between the side tube aperature and the track aperature to restrict relative movement between the side tube and the track.

20. The towable apparatus of claim 15 further comprising a restriction means communicating between the frame and the conveying means to partially restrict movement of the frame relative to the track means.

21. The towable apparatus of claim 11 wherein the reversible connection means comprises:
   a base portion fixedly attached to the conveyor;
   a distal portion pivotally attached to the front portion, the distal portion capable of being pivoted between an operating position and a towing position;
   a pin means attached to the distal portion such that the pin means projects generally downward when the distal portion is in the towing position and is capable of reversible connection to the fifth wheel.

22. The towable apparatus of claim 21 wherein the reversible connector means further comprises a support angle attached to the distal portion, the support angle at least partially contacting the conveyor when the distal portion is in the towing position.

23. The towable apparatus of claim 21 wherein the base portion has a generally flat upper side and a generally flat lower side, the base portion being connected to the conveyor at its upper side and the base portion being connected to the distal portion at its lower side.

24. The towable apparatus of claim 23 wherein the distal portion has a generally flat upper portion, wherein the flat upper portion is parallel to the conveyor when the distal portion is in the operating position and parallel to the ground when it is in the towing position.

25. A method of reversibly connecting an apparatus to a tractor having a fifth wheel, the apparatus having a chassis, a downwardly extending conveyor means attached to the chassis, the conveyor means having means to reversibly engage the fifth wheel near its distal end, and means for moving the conveyor means relative to the chassis, the method comprising the steps of:
   raising the distal end of the conveyor means to the height of the fifth wheel; and
   moving the apparatus relative to the tractor to engage the fifth wheel with the fifth wheel engagement means.

26. The method of claim 25 further comprising the step of moving the conveyor means toward the chassis to at least partially raise the chassis off the ground.

27. The method of claim 26 wherein the fifth wheel engagement means can be moved between an operating position and a towing position, and the method further comprising the step of moving the fifth wheel engagement means from the operating position to the towing position.

* * * * *